(12) United States Patent
Yasuda

(10) Patent No.: US 11,539,276 B2
(45) Date of Patent: Dec. 27, 2022

(54) MOLDED PRODUCT, ELECTRIC MOTOR, APPARATUS AND METHOD FOR MANUFACTURING MOLDED PRODUCT

(71) Applicant: Fanuc Corporation, Yamanashi (JP)

(72) Inventor: Ryuya Yasuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 141 days.

(21) Appl. No.: 17/016,593

(22) Filed: Sep. 10, 2020

(65) Prior Publication Data

US 2021/0099059 A1    Apr. 1, 2021

(30) Foreign Application Priority Data

Sep. 27, 2019   (JP) .............................. JP2019-177774

(51) Int. Cl.
*H02K 15/14*   (2006.01)
*H02K 5/04*   (2006.01)
*B29C 45/22*   (2006.01)
*B29C 45/26*   (2006.01)

(52) U.S. Cl.
CPC ......... *H02K 15/14* (2013.01); *B29C 45/2628* (2013.01); *H02K 5/04* (2013.01)

(58) Field of Classification Search
CPC . H02K 5/04; H02K 1/04; H02K 15/14; B29C 45/22

USPC .................................................. 310/43, 40 R
See application file for complete search history.

(56) References Cited

U.S. PATENT DOCUMENTS 6,058,593 A * 5/2000 Siess ...................... H02K 5/124
                                                            310/43

FOREIGN PATENT DOCUMENTS

JP             07243028 A      9/1995
WO    WO-2012172669 A1 * 12/2012 ......... B29C 45/2606

* cited by examiner

*Primary Examiner* — Jose A Gonzalez Quinones
(74) *Attorney, Agent, or Firm* — RatnerPrestia

(57) ABSTRACT

A molded product in which a parting line can be disposed at an inconspicuous position on the appearance of the product. The molded product includes a main body having a cylindrical shape and a hole penetrating through the main body in a radial direction, or a protrusion protruding in the radial direction from the main body, and in the molded product, a parting line corresponding to a matching surface of molds is formed in the molded product, and the parting line has a first line extending from the hole or the protrusion to one side in a circumferential direction of the main body, and a second line extending from an end point on the one direction of the circumferential direction of the first line to an end portion in an axial direction of the main body.

9 Claims, 14 Drawing Sheets

MOLDED PRODUCT, ELECTRIC MOTOR, APPARATUS AND METHOD FOR MANUFACTURING MOLDED PRODUCT

CROSS-REFERENCE TO RELATED APPLICATIONS

This application is a new U.S. Patent Application that claims benefit of Japanese Patent Application No. 2019-177774, filed Sep. 27, 2019, the disclosure of which is incorporated herein by reference in its entirety for all purposes.

BACKGROUND OF THE INVENTION

1. Field of the Invention

The present invention relates to a molded product, an electric motor, and an apparatus and a method for manufacturing the molded product.

2. Description of the Related Art

A molded product has been known in which a parting line to be formed at a position corresponding to a mating surface of molds is disposed at a predetermined position (JP 07-243028 A).

In related art, in a molded product in which a hole or a protrusion is formed, a parting line is disposed at a position of the hole or the protrusion from a perspective of allowing the molded product to be taken out from the molds. In such a molded product, it is desirable to dispose the parting line at an inconspicuous position on the appearance of the product.

SUMMARY OF THE INVENTION

In an aspect of the present disclosure, a molded product includes a cylindrical main body; and a hole penetrating through the main body in a radial direction of the main body, or a protrusion protruding from the main body in the radial direction. A parting line corresponding to a mating surface of molds is formed on the molded product. The parting line includes a first line extending from the hole or the protrusion in one direction of a circumferential direction of the main body, and a second line extending from an end point of the first line in the one direction of the circumferential direction to an end portion of the main body in an axial direction of the main body.

In another aspect of the present disclosure, an electric motor includes the above-described molded product as a motor housing. In yet another aspect of the present disclosure, an apparatus for manufacturing the above-described molded product includes a pair of molds openable and closable relative to each other, and configured to define a space for forming the molded product inside thereof when the pair of molds are closed.

The pair of molds have a mating surface where the pair of molds contact each other when the pair of molds are closed. The mating surface has a first mating surface extending in the one direction of the circumferential direction from a position corresponding to the hole or the protrusion, the first mating surface forming the first line; and a second mating surface extending in one direction of the axial direction from an end edge of the first mating surface in the one direction of the circumferential direction, the second mating surface forming the second line.

In yet another aspect of the present disclosure, a method of manufacturing the molded product by the above-described apparatus includes injecting a liquid material into the space in a state where the pair of molds are closed such that the pair of molds contact each other at the mating surface, and solidifying the material to mold the molded product, and subsequently, opening the pair of molds (52, 54) and taking out the molded product therefrom.

According to the present disclosure, the hole or the protrusion can be molded by the molds, while the parting line can be disposed at a relatively inconspicuous position on appearance. This can improve aesthetics of the molded product.

DETAILED DESCRIPTION

Figure 1:
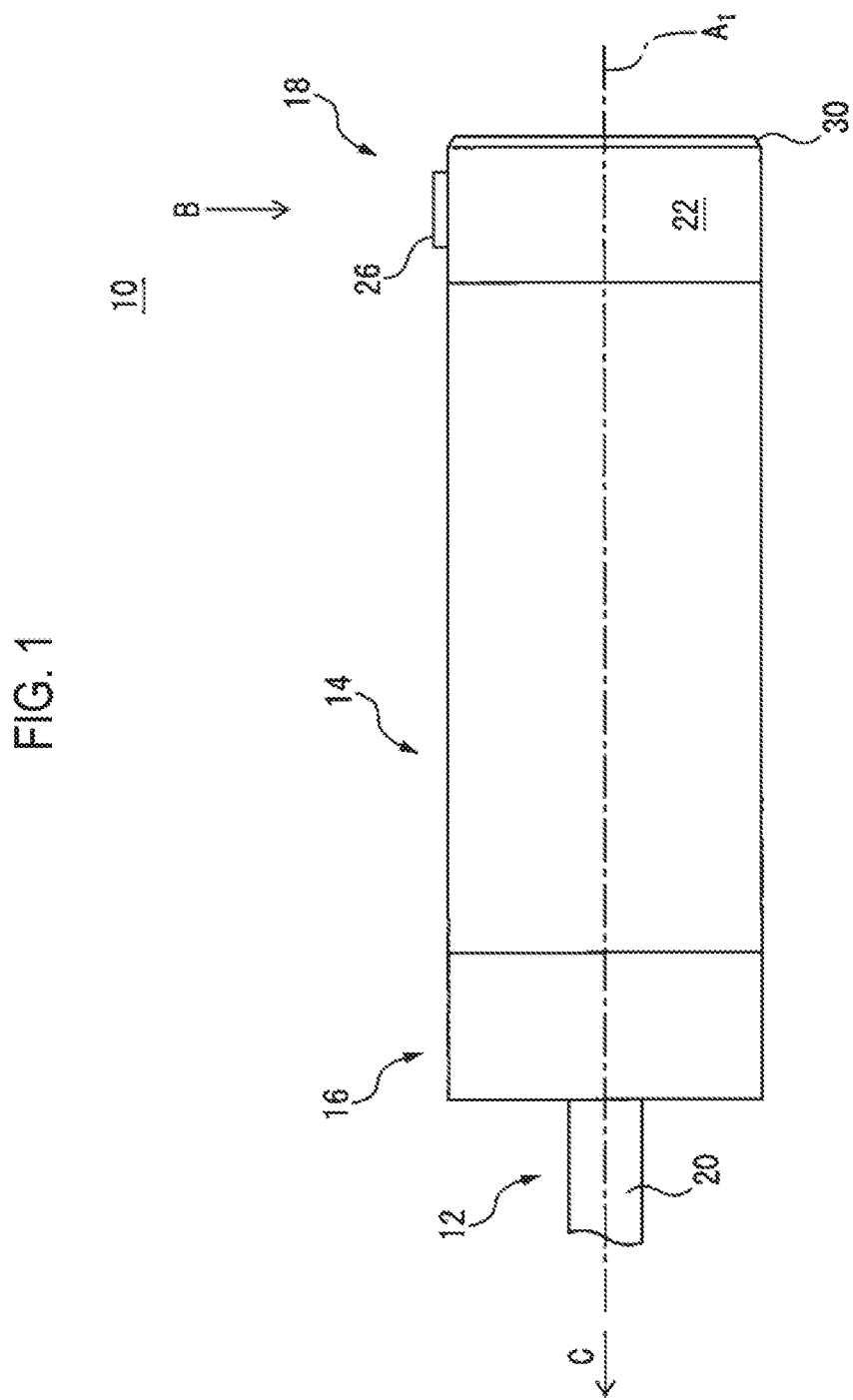
FIG. 1 is a side view of an electric motor according to an embodiment.

Hereinafter, embodiments of the present disclosure will be described in detail with reference to the drawings. Note that, in the various embodiments to be described below, similar components are denoted by the same reference numerals, and redundant descriptions thereof will be omitted. With reference to FIG. 1, an electric motor 10 according to an embodiment will be first described. In the following description, an "axial direction" indicates a direction along a rotational axis $A_1$ of a rotor of the electric motor 10, a "circumferential direction" indicates a direction about the axis $A_1$", and a "radial direction" indicates a direction of a radius of a circle centered about the axis $A_1$. In addition, for convenience, a direction indicated by an arrow C in the drawings is referred to as a frontward in the axial direction (or axially frontward), a direction indicated by an arrow in the drawings is referred to as one direction of the circumferential direction, and a direction indicated by an arrow F is referred to as the other direction of the circumferential direction.

The electric motor 10 includes a rotor 12, a stator 14, and molded products 16 and 18. The rotor 12 is supported by the molded products 16 and 18 so as to be rotatable about the axis $A_1$, and includes a rotary shaft 20 and a rotor core (not illustrated) fixed on an outer circumferential surface of the rotary shaft 20. The rotary shaft 20 extends straight along the axis $A_1$. The rotor core is disposed inside the stator 14 so as to be slightly separated radially inward from the stator 14, and has a plurality of magnets (not illustrated) therein.

The stator 14 is a cylindrical member having an octagonal outer shape, and comprised of a plurality of magnetic steel sheets laminated in the axial direction. A coil (not illustrated) is wound around an inner circumferential portion of the stator 14. The molded product 16 is a motor housing fixed to an axially front end of the stator 14. The molded product 16 is a cylindrical member having substantially the same outer shape as the stator 14 (i.e., an octagonal shape), and is molded by molds (e.g., aluminum die-casting).

On the other hand, the molded product 18 is a motor housing fixed to an axially rear end of the stator 14. The molded product 18 is molded by the molds (e.g., aluminum die-casting), similarly to the molded product 16 described above. Hereinafter, the molded product 18 will be described in detail with reference to FIG. 2 and FIG. 3.

The molded product 18 includes a main body 22, a through-hole 24, and a protrusion 26. The main body 22 is a cylindrical member having substantially the same outer shape as the stator 14 (i.e., an octagonal shape). The main body 22 is disposed substantially concentrically to the stator 14 with respect to the axis $A_1$. The main body 22 has an axially front end face 23 and an axially rear end face 25. At least one of the end faces 23 and 25 is formed to be a flat surface substantially orthogonal to the axial direction by post-processing (e.g., cutting).

The protrusion 26 is provided at the main body 22 so as to protrude radially outward from the main body 22. The protrusion 26 has a square outer shape when viewed from the radial direction, and is formed integrally with an outer surface 22a that defines one side of the octagonal outer shape of the main body 22. The through-hole 24 is provided so as to penetrate through the main body 22 and the protrusion 26 in the radial direction. In the present embodiment, the through-hole 24 is a circular hole having a central axis $A_2$, and penetrates through the main body 22 and the protrusion 26 from an outer surface 26a of the protrusion 26 to an inner circumferential surface 22b (FIG. 3) of the main body 22. In the present embodiment, the through-hole 24 and the protrusion 26 are disposed substantially concentrically.

A lead line from the coil wound around the stator 14 or a signal line from an electronic device (not illustrated) such as an encoder provided inside the molded product 18 is led out of the electric motor 10 through the through-hole 24. A chamfered portion 30 is formed at an axially rear end portion of the main body 22. The chamfered portion 30 is provided at a radially outer edge of the end surface 25 so as to extend in the circumferential direction over the entire circumference of the main body 22.

Figure 2:
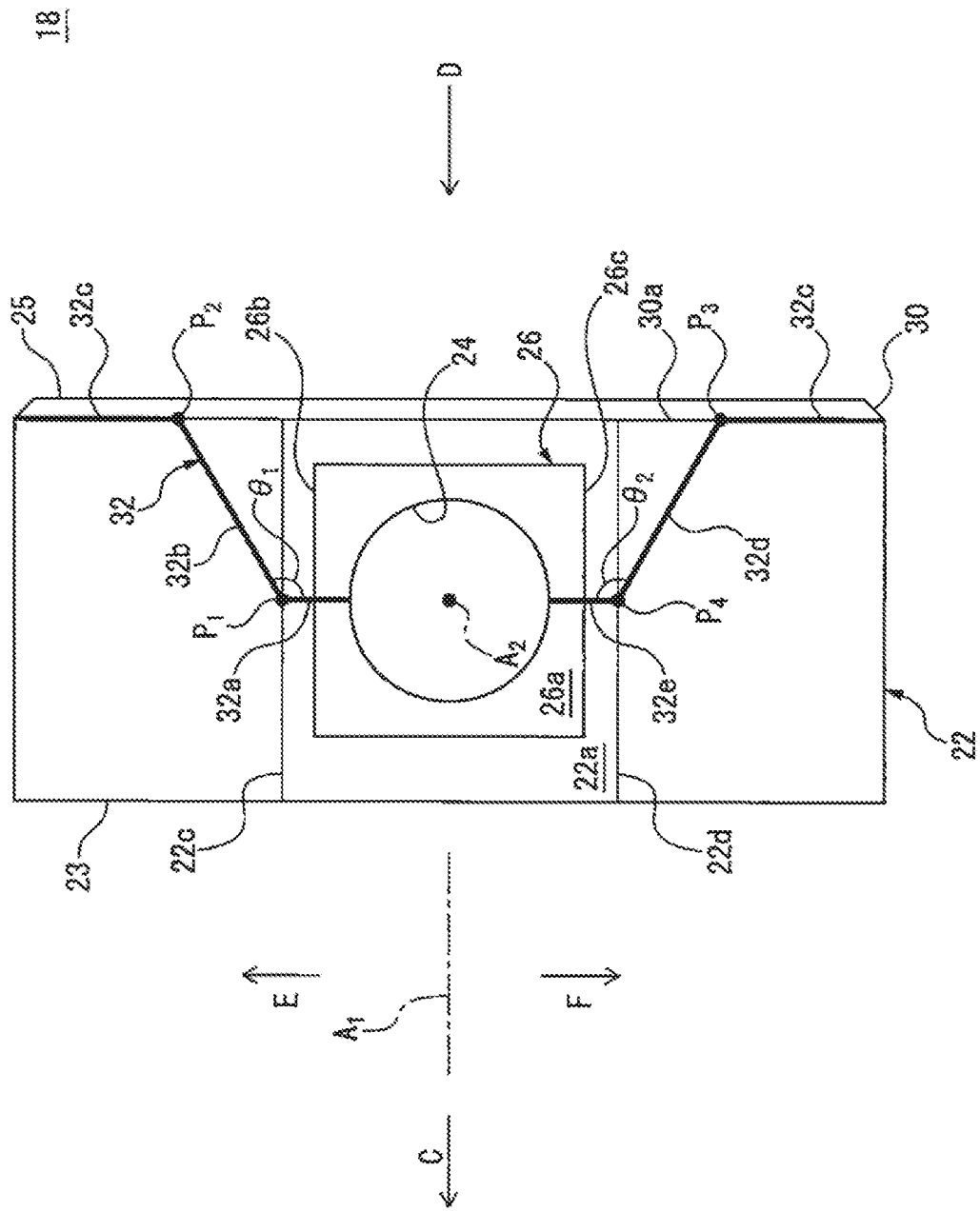
FIG. 2 is a diagram of a molded product illustrated in FIG. 1 as viewed from a direction of an arrow B in FIG. 1.
Figure 3:
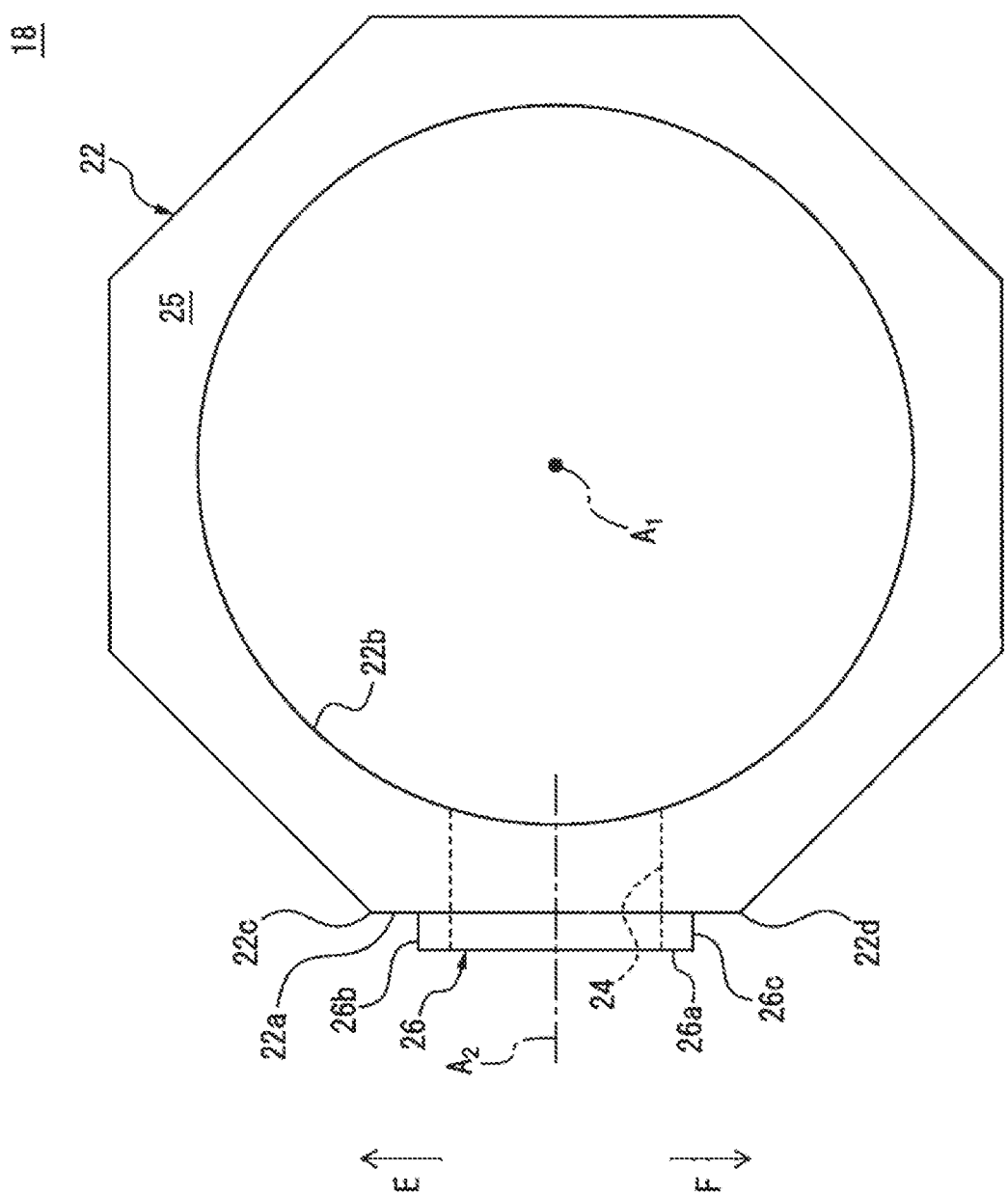
FIG. 3 is a diagram of the molded product illustrated in FIG. 2 as viewed from a direction of an arrow D in FIG. 2.

As illustrated in FIG. 2, a parting line 32 is formed on the molded product 18. The parting line 32 is a small protrusion formed at a position corresponding to a mating surface of a pair of molds described below when the molded product 18 is molded by the pair of molds. In the present embodiment, the parting line 32 includes a line 32a, a line 32b, a line 32c, a line 32d, and a line 32e.

The line 32a (first line) is disposed at substantially the same position in the axial direction as the center of the through-hole 24 and the protrusion 26 (i.e., the axis $A_2$), and linearly extends in the one direction of the circumferential direction from the through-hole 24 to an end point $P_1$. Note that, in the present embodiment, the end point $P_1$ is separate in the one direction of the circumferential direction from an end face 26b in the one direction of the circumferential direction of the protrusion 26, and is disposed on an end edge 22c of the outer surface 22a (i.e., a side of the octagonal outer shape of the main body 22) in the one direction of the circumferential direction.

The line 32b (second line) extends from the end point $P_1$ to the axially rear end portion of the main body 22. Specifically, the line 32b linearly extends from the end point $P_1$ to an end point $P_2$ disposed on an axially front edge 30a of the chamfered portion 30, so as to be inclined with respect to the axial direction. An angle $\theta_1$ between the lines 32a and 32b is set to an obtuse angle (e.g., 120°).

The line 32c (third line) extends in the one direction of the circumferential direction from the end point $P_2$ to an end point $P_3$ along the edge 30a of the chamfered portion 30. In the present embodiment, the end point $P_3$ is disposed on the edge 30a of the chamfered portion 30, and the line 32c extends in the circumferential direction such that the entirety of the line 32c is disposed on the edge 30a of the chamfered portion 30.

On the other hand, similarly to the line 32a, the line 32e (first line) is disposed at substantially the same position in the axial direction as the center (axis $A_2$) of the through-hole 24 and the protrusion 26, and extends straight in the other direction of the circumferential direction from the through-hole 24 to an end point $P_4$. In the present embodiment, the end point $P_4$ is separate in the other direction of the circumferential direction from an end face 26c of the protrusion 26 in the other direction of the circumferential direction, and disposed on an end edge 22d of the outer surface 22a (i.e., one side of the octagonal outer shape of the main body 22) in the other direction of the circumferential direction.

The line 32d (second line) extends from the end point $P_4$ to the axially rear end portion of the main body 22. Specifically, the line 32d linearly extends from the end point $P_4$ to the end point $P_3$ so as to be inclined with respect to the axial direction. An angle $\theta_2$ between the lines 32e and 32d is set to an obtuse angle (e.g., 120°). Note that the angles $\theta_1$ and $\theta_2$ may be the same or different from each other.

Next, an apparatus 50 for manufacturing the above-described molded product 18 will be described with reference to FIG. 4 and FIG. 5. The apparatus 50 includes a pair of molds 52 and 54, a pin 56, a drive section 57, a material supply device 63, and an extruding device 61. The pair of molds 52 and 54 are provided so as to be openable and closable relative to each other. More specifically, the mold 54 is fixed, while the mold 52 is movably provided so as to approach and separate from the mold 54. Note that FIG. 4 illustrates a state in which the molds 52 and 54 are closed.

Figure 4:
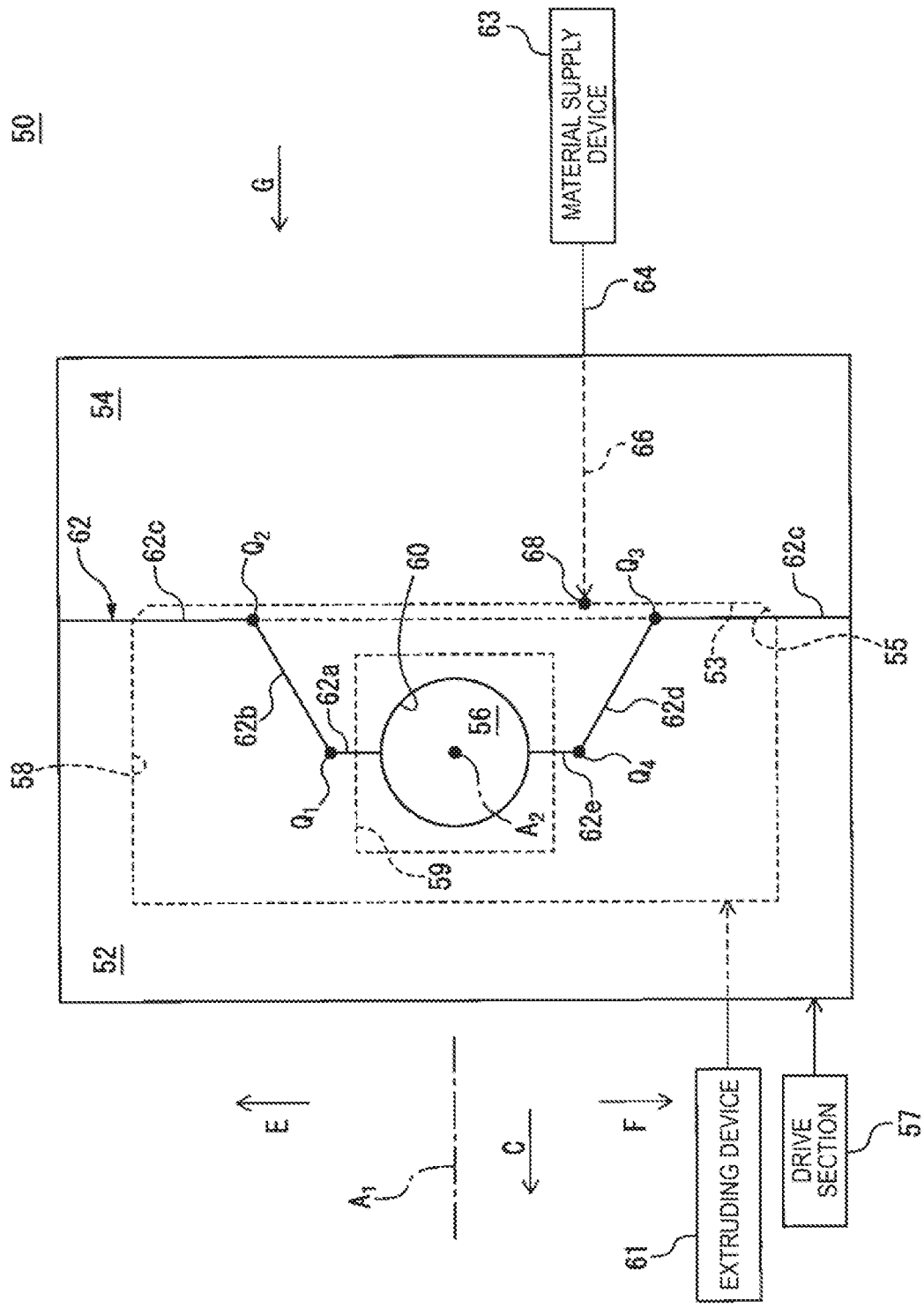
FIG. 4 is a diagram of an apparatus for manufacturing the molded product according to the embodiment.
Figure 5:
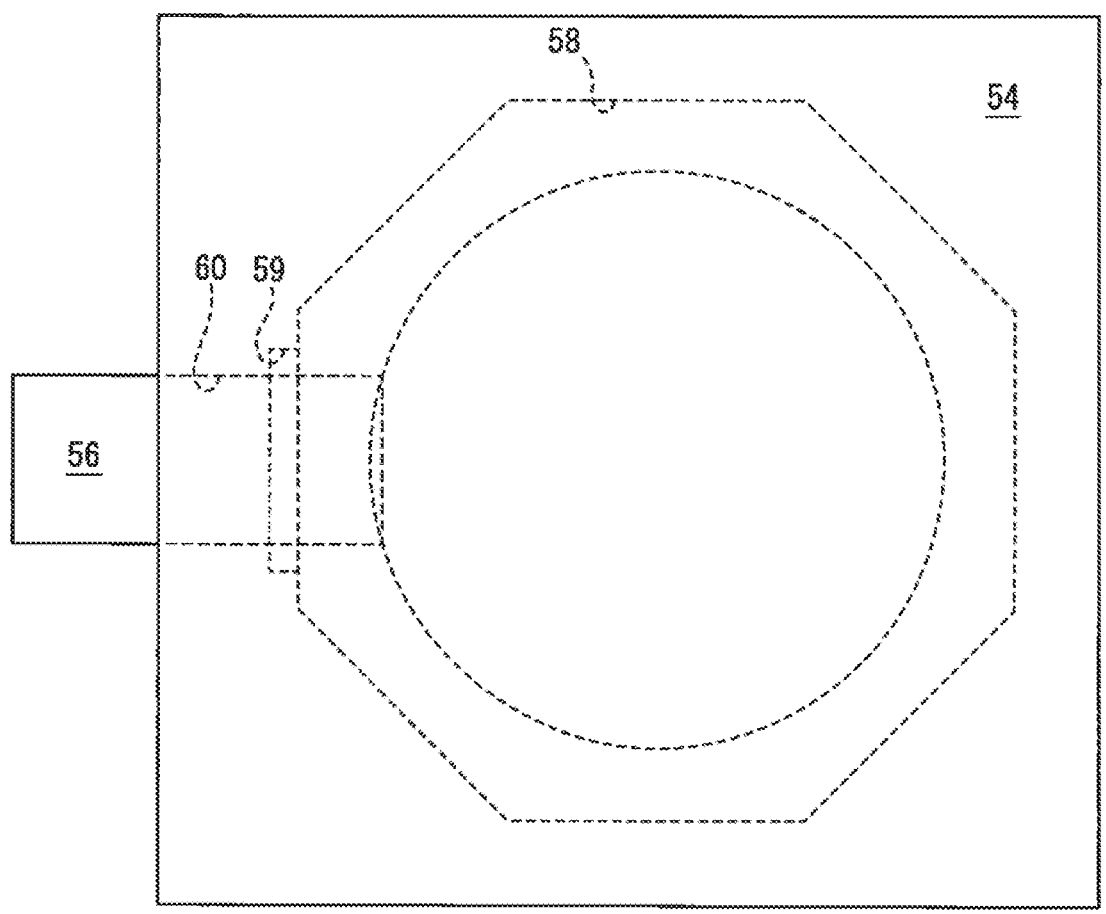
FIG. 5 is a diagram of a pair of molds illustrated in FIG. 4 as viewed from a direction of an arrow G in FIG. 4.

The pair of molds 52 and 54 define therein a cylindrical space 58 for forming the above-described main body 22 and a space 59 for forming the above-described protrusion 26, when the molds 52 and 54 are closed as illustrated in FIG. 4. A cylindrical inclined surface 55 for forming the above-described chamfered portion 30 is formed at an radially outer edge portion of a bottom surface 53 of the mold 54 that defines the space 58.

The pair of molds 52 and 54 have a mold hole 60 and a mating surface 62. The mold hole 60 is a circular hole having the central axis $A_2$, which corresponds to the above-described through-hole 24, and is defined between the molds 52 and 54 when the molds 52 and 54 are closed. The mold hole 60 is in communication with the space 59, and disposed concentrically with the space 59 with respect to the axis $A_2$.

The mating surface 62 is comprised of a surface of the mold 52 and a surface of the mold 54 that contact each other when the pair of molds 52 and 54 are closed. The mating surface 62 includes mating surfaces 62a, 62b, 62c, 62d, and 62e. The mating surface 62a (first mating surface) is disposed at substantially the same position in the axial direction as a center of the mold hole 60 (i.e., the axis $A_2$), and extends from the mold hole 60 in the one direction of the circumferential direction. The mating surface 62a is a flat surface substantially orthogonal to the axial direction. The mating surface 62a forms the line 32a described above.

The mating surface 62b (second mating surface) extends axially rearward from an end edge $Q_1$ of the mating surface 62a in the one direction of the circumferential direction. Specifically, the mating surface 62b is a flat surface and extends from the end edge $Q_1$ to an end edge $Q_2$ opposite the end edge $Q_1$ so as to be inclined with respect to the axial direction. The mating surface 62b forms the line 32b described above.

The mating surface 62c (third mating surface) is an annular flat surface extending in the one direction of the circumferential direction from the end edge $Q_2$ to an end edge $Q_3$. The mating surface 62c is substantially orthogonal to the axial direction. The mating surface 62c forms the line 32c described above. The end edges $Q_2$ and $Q_3$ and the mating surface 62c are disposed at the same position in the axial direction as an axially front end of the above-described inclined surface 55.

On the other hand, similarly to the mating surface 62a, the mating surface 62e (first mating surface) is disposed at substantially the same position in the axial direction as the center (axis $A_2$) of the mold hole 60, and extends in the other direction of the circumferential direction from the mold hole 60 to an end edge $Q_4$. The mating surface 62e is a flat surface substantially orthogonal to the axial direction, and forms the line 32e described above.

The mating surface 62d (second mating surface) extends axially rearward from the end edge $Q_4$ of the mating surface 62e in the other direction of the circumferential direction. Specifically, the mating surface 62e is a flat surface and extends from the end edge $Q_4$ to the end edge $Q_3$ so as to be inclined with respect to the axial direction. The mating surface 62d forms the line 32d described above.

The pin 56 is a circular column member having the same outer shape as the mold hole 60 and disposed concentrically with the mold hole 60. The pin 56 is inserted into the mold hole 60 so as to be able to advance and retract in the radial direction with respect to the spaces 56 and 59. For example, the pin 56 may be advanced and retracted manually by an operator, or the apparatus 50 may further include a second drive section (cylinder, motor, or the like) configured to move the pin 56 automatically. The pin 56 forms the through-hole 24 described above.

The drive section 57 includes e.g. a cylinder or a motor, and move the mold 52 with respect to the mold 54 to open and close the molds 52 and 54. The material supply device 63 injects a liquid material of the molded product 18 into the space 58 and 59 inside the pair of molds 52 and 54 through a sprue 64, a runner 66, and a gate 68, and fills the space 58 and 59 with the material. Note that, in the present embodiment, the sprue 64, the runner 66, and the gate 68 are provided at the mold 54. However, the sprue 64, the runner 66, and the gate 68 may be provided at the mold 52.

The extruding device 61 applies force to the molded product 18 stuck to one mold 52 order to pull the molded product 18 away from the one mold 52, after the molded product 18 is molded by the molds 52 and 54 and the molds 52 and 54 are opened. Specifically, the extruding device 61 includes an extrusion pin (not illustrated) provided at the mold 52 so as to be able to advance and retract in the axial direction, and a third drive section (not illustrated) configured to drive the extrusion pin. The extruding device 61 pushes the molded product 18 stuck to the mold 52 axially rearward by the extrusion pin, whereby the molded product 18 can be separated away from the mold 52 and taken out from the molds 52 and 54.

Next, a method of manufacturing the molded product 18 by the apparatus 50 will be described. First, the drive section 57 closes the pair of molds 52 and 54 (so-called mold clamping) such that the pair of molds 52 and 54 contact each other at the mating surface 62. At this time, the pin. 56 is inserted into the spaces 58 and 59 through the mold hole 60 so as to be disposed at the advance position at which the pin 56 crosses the space 58 and 59 in the radial position. Then, the material supply device 63 injects the liquid material of the molded product 18 into the spaces 58 and 59, and fills the spaces 58 and 59 with the material.

Then, the operator cools the material filled in the spaces 58 and 59 so as to solidify the material. As a result, the molded product 18 is molded in the spaces 58 and 59. Then, the operator (or the second drive section) moves the pin 56 radially outward to the retraction position at which the pin 56 is pulled out from the spaces 58 and 59. Then, the drive section 57 moves the mold 52 axially forward so as to be separated away from the mold 54, thereby opening the molds 52 and 54.

At this time, the molded product 18 is stuck to the mold 52 and moves axially forward together with the mold 52. Then, the extruding device 61 moves the extrusion pin axially rearward by the third drive section, and pushes the molded product 18 stuck to the mold. 52 by the extrusion pin. As a result, the molded product 18 is separated away from the mold 52 and taken out from the molds 52 and 54.

In this way, the molded product 18 in which the parting line 32 is formed at a position corresponding to the mating surface 62 is manufactured. As described above, the parting line 32 includes the line 32a, 32e extending from the through-hole 24 and the protrusion 26, and the line 32b, 32d extending from the line 32a, 32e to the axially rear end portion of the main body 22.

According to this configuration, the through-hole 24 and the protrusion 26 can be formed by the molds 52 and 54, while the parting line 32 can be disposed at the end portion in the axial direction of the main body 22 within the circumferential section other than the lines 32a, 32b, 32d and 32e (in the present embodiment, this circumferential section corresponds to the line 32b).

Accordingly, since the parting line 32 can be disposed at a relatively inconspicuous position on the appearance within a part of the circumferential section (line did) of the molded product. 18, it is possible to improve the aesthetics of the molded product 18. In addition, if the parting line 32 is removed by post-processing (e.g., cutting) in the circumferential section other than the lines 32a, 32b, 32d, and 32e, it becomes easier to process the parting line 32 in this circumferential section since the parting line 32 is disposed at the axially end portion of the main body 22 within this circumferential section.

In addition, in the present embodiment, the parting line 32 includes the line 32c disposed at the chamfered portion 30. According to this configuration, the line 32b can be more effectively made inconspicuous on the appearance. In the present embodiment, the line 32b is disposed on the edge 30a of the chamfered portion 30. According to this configuration, the line 32b can be more effectively made inconspicuous, and therefore processing of the parting line 32 in the post-processing can be omitted. Note that the line 32b is not limited to be formed on the edge 30a of the chamfered portion. 30, but may be formed on a planar portion of the chamfered portion 30.

Figure 6:
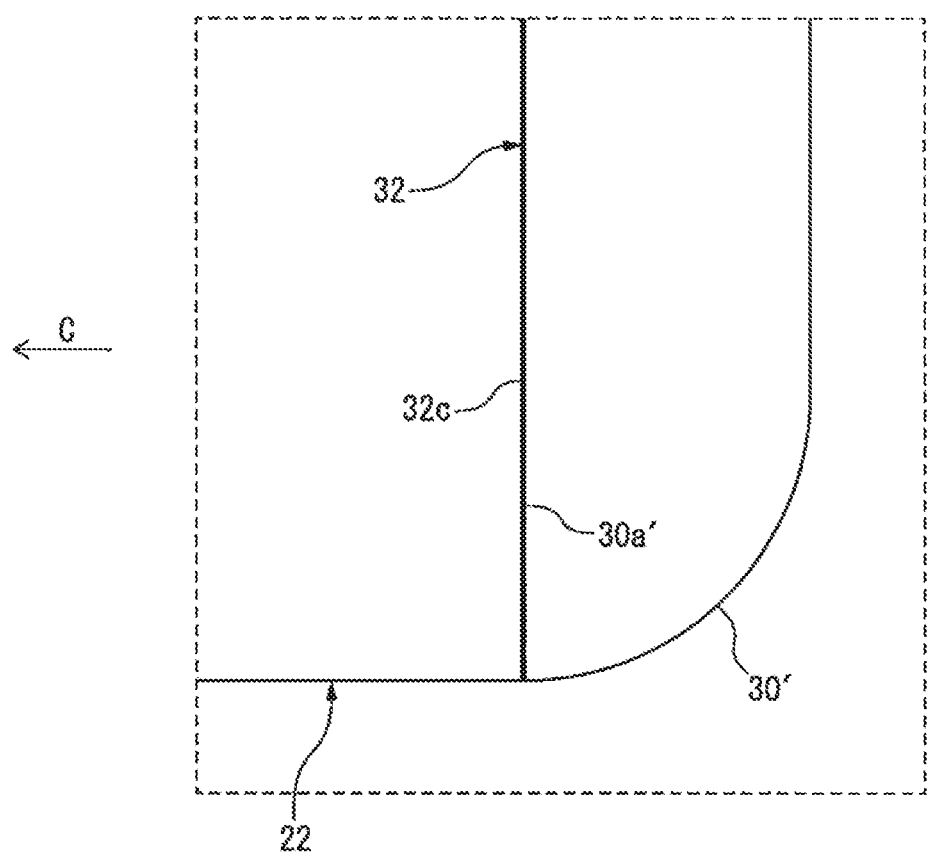
FIG. 6 is an enlarged view of a main portion of a molded product according to another embodiment.

Additionally, in the main body 22, instead of the chamfered portion 30, a rounded corner portion may be formed. Such an embodiment is illustrated in FIG. 6. In the embodiment illustrated in FIG. 6, a rounded corner portion. 30' (so-called, R part) is formed at the axially rear end portion of the main body 22. The line 32c extends along an edge 30a' of the rounded corner portion 30'. The rounded corner portion 30' may be molded by the pair of molds, or may be formed by the post-processing (cutting).

Figure 7:
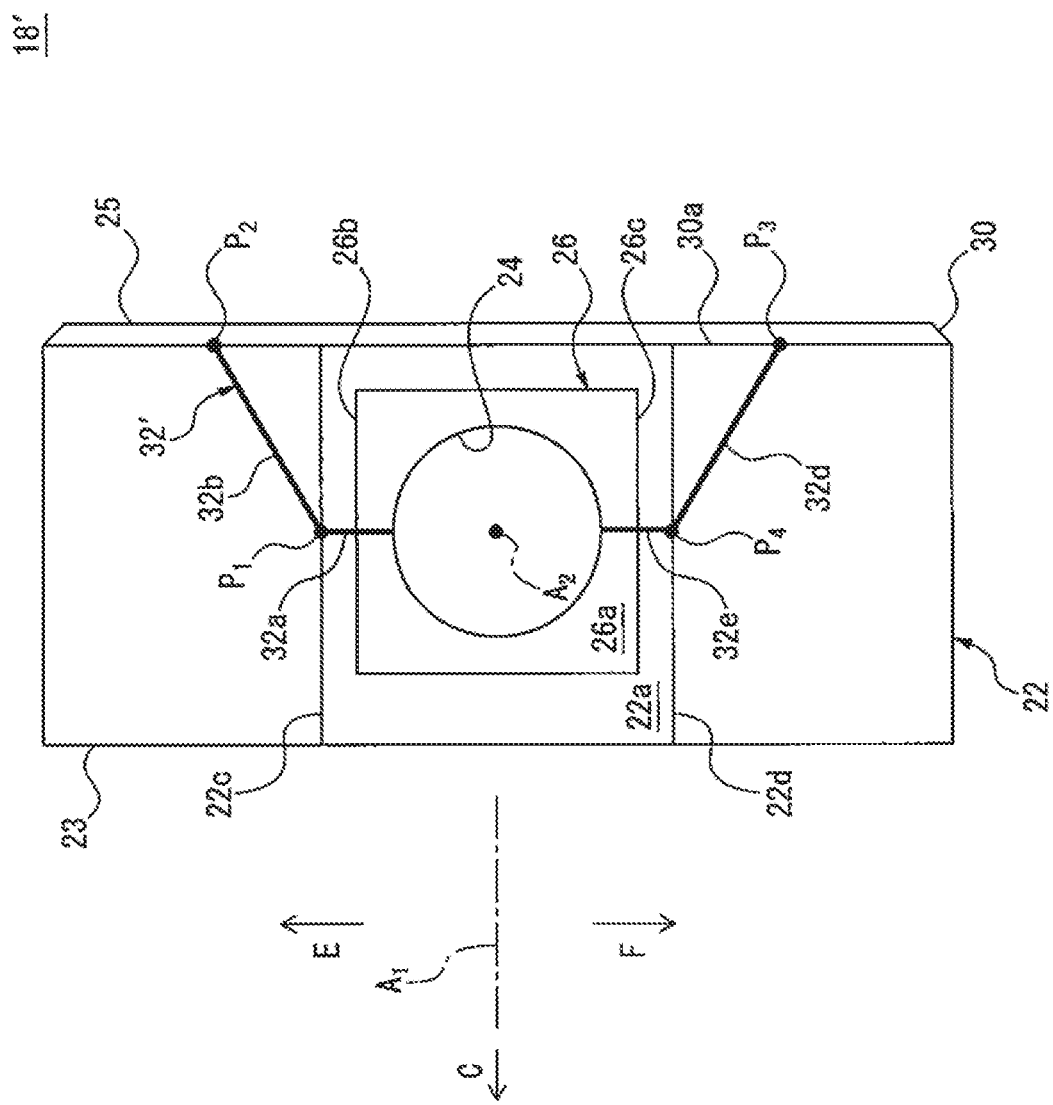
FIG. 7 is a diagram of a molded product according to yet another embodiment, and corresponds to FIG. 2.

Next, a molded product 18' according to another embodiment will be described with reference to FIG. 7. The molded product 18' can be applied to the electric motor 10 instead of the molded product 18 described above. The molded product 18' is different from the above-described molded product 18 in a parting line 32'. Specifically, the parting line 32' includes the lines 32a, 32b, 32d, and 32e, while it does not include the line 32c.

Figure 8:
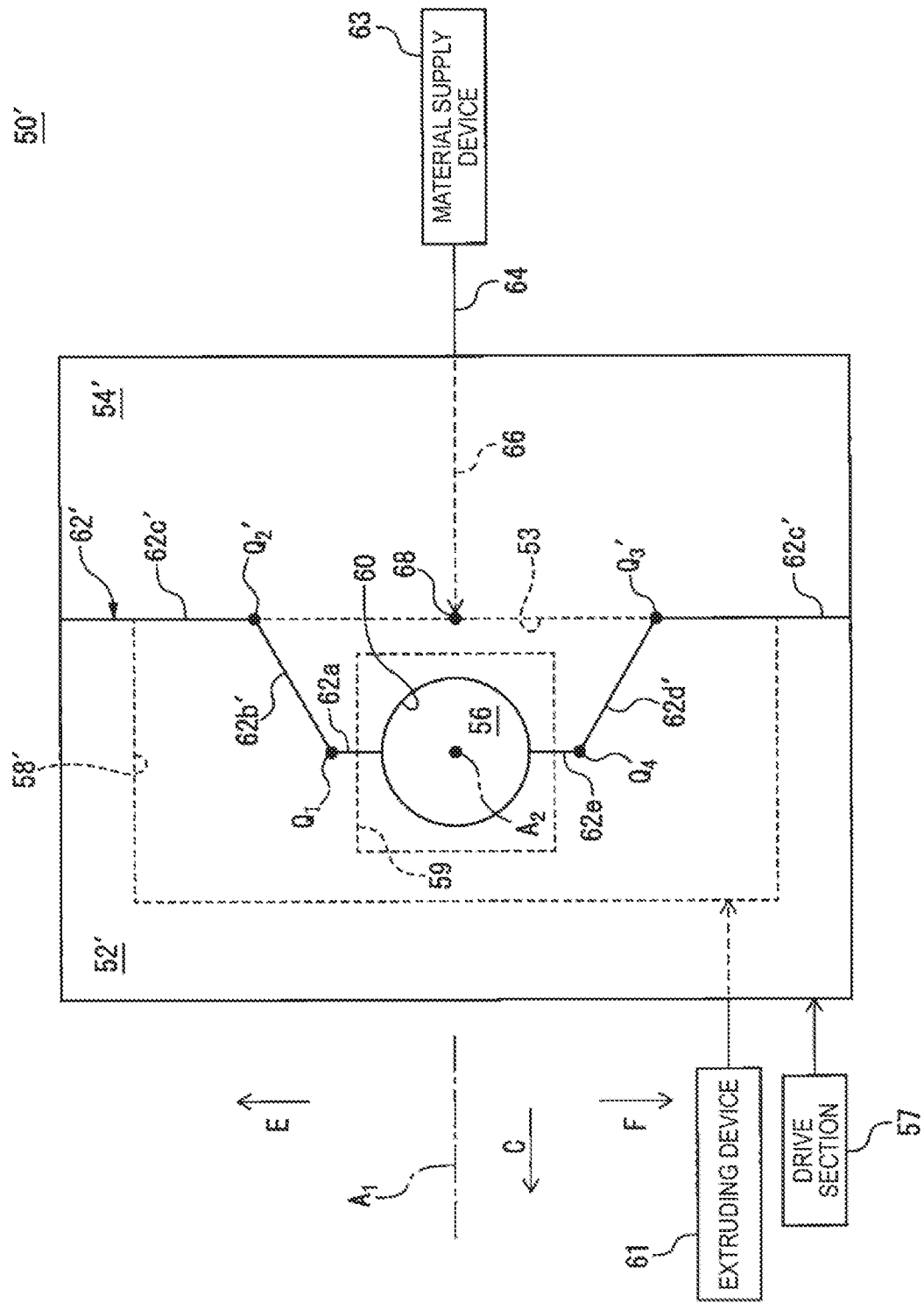
FIG. 8 is a diagram of an apparatus for manufacturing the molded product according to the other embodiment.

Next, an apparatus 50' for manufacturing the molded product 18' will be described with reference to FIG. 8. The apparatus 50' is different from the above-described apparatus 50 in a pair of molds 52' and 54', In particular, the pair of molds 52' and 54' have the mold hole 60 and a mating surface 62' including mating surfaces 62a, 62b', 62c', 62d', and 62e.

The mating surface 62b' (second mating surface) is a flat surface extending axially rearward from the end edge $Q_1$ to an end edge $Q_2$' opposite the end edge $Q_1$ so as to be inclined with respect to the axial direction. The mating surface 62c' (third mating surface) is an annular flat surface extending in the one direction of the circumferential direction from the end edge $Q_2$' to an end edge $Q_3$', and is substantially orthogonal to the axial direction. In this regard, the end edges $Q_2$' and $Q_3$' and the mating surface 62c' are disposed at the same position in the axial direction as the bottom surface 53 of the mold 54'.

The mating surface 62d' (second mating surface) is a flat surface extending axially rearward from the end edge $Q_4$ to the end edge $Q_3$' so as to be inclined with respect to the axial direction. In the mold 54', the inclined surface 55 described above is not formed, and the pair of molds 52' and 54' define a space 58' therein when the pair of molds 52' and 54' are closed.

Next, a method of manufacturing the molded product 18' by the apparatus 50' will be described. First, the drive section. 57 closes the pair of molds 52' and 54' (so-called mold clamping) such that the pair of molds 52' and 54' contact each other at the mating surface 62'. At this time, the pin 56 is disposed at the advance position at which the pin 56 crosses the spaces 58' and 59 through the mold hole 60. The material supply device 63 then injects the liquid material into the spaces 58' and 59 and fills the spaces 58' and 59 with the material.

Then, the operator coos the material filled in the spaces 58' and 59 so as to solidify the material. The operator (or second drive section) then moves the pin 56 radially outward so as to dispose the pin. 56 at the retraction position. The drive section 57 then opens the molds 52' and 54', and the extruding device 61 drives the extrusion pin to take out the molded product from the molds 52' and 54'.

Figure 9:
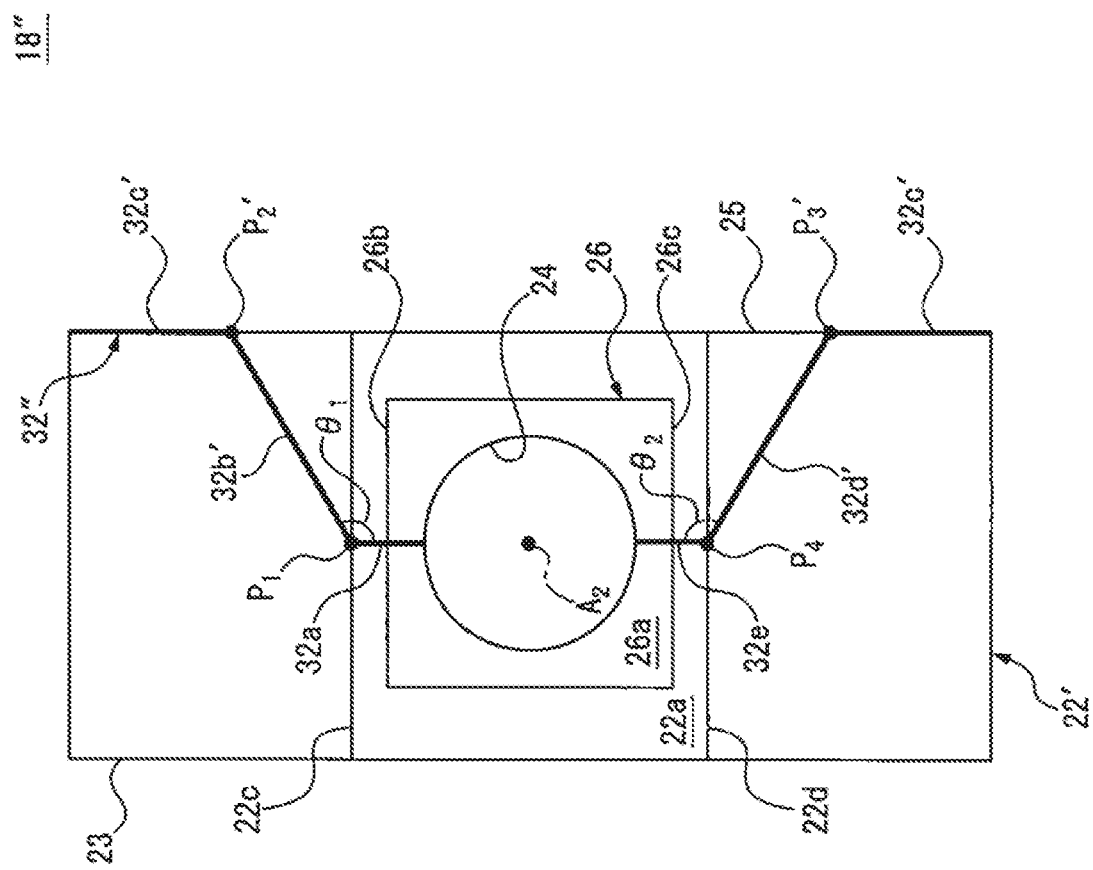
FIG. 9 is a diagram of a molded product molded by the molds illustrated in FIG. 8, and corresponds to FIG. 7.

The molded product formed at this time is illustrated in FIG. 9. The molded product 18" illustrated in FIG. 9 differs from the above-described molded product 18' in the following configuration. Specifically, the molded product 18" is formed with a parting line 32" including the lines 32a, 32b', 32c', 32d', and 32e.

The line 32b' is formed at a position corresponding to the mating surface 62b' of the pair of molds 52' and 54'. The line 32b' linearly extends from the end point $P_1$ to the end point $P_2$' so as to be inclined with respect to the axial direction. The line 32c' is formed at a position corresponding to the mating surface 62c' of the pair of types 52' and 54'. The line 32c' extends in the one direction of the circumferential direction from the end point $P_2$' to the end point $P_3$'.

The end points $P_2$' and $P_3$' are disposed at a position of the rear end face 25 in the axial direction of a main body 22' of the molded product 18". Therefore, the line 32c' is formed at the outer edge in the radial direction of the end face 25. The line 32d' is formed at a position corresponding to the mating surface 62d' of the pair of molds 52' and 54'. The line 32d' linearly extends from the end point $P_4$ to the end point $P_3$' so as to be inclined with respect to the axial direction. In this way, the molded product 18" is molded by the pair of molds 52' and 54.

After the molded product 18" is molded, the operator chamfers the axially rear end portion of the main body 22' of the molded product 18" by e.g. a processing machine, and forms the chamfered portion 30 at the axially rear end portion. As a result, as illustrated in FIG. 7, the molded product 18' having the main body 22 formed with the chamfered portion 30 is manufactured. By this chamfering, the chamfered portion 30 is formed, along with which the axially rear end portions of the lines 32b' and 32d' illustrated in FIG. 9, as well as the line 32cv, are removed so as to form the parting line 32' illustrated in FIG. 7.

According to the molded product 18', the through-hole 24 and the protrusion. 26 can be molded by the molds 52' and 54', while the parting line 32' can be made inconspicuous by removing a part of the parting line 32' (i.e., the axially rear end portions of the lines 32b' and 32d', and the line 32c').

Figure 10:
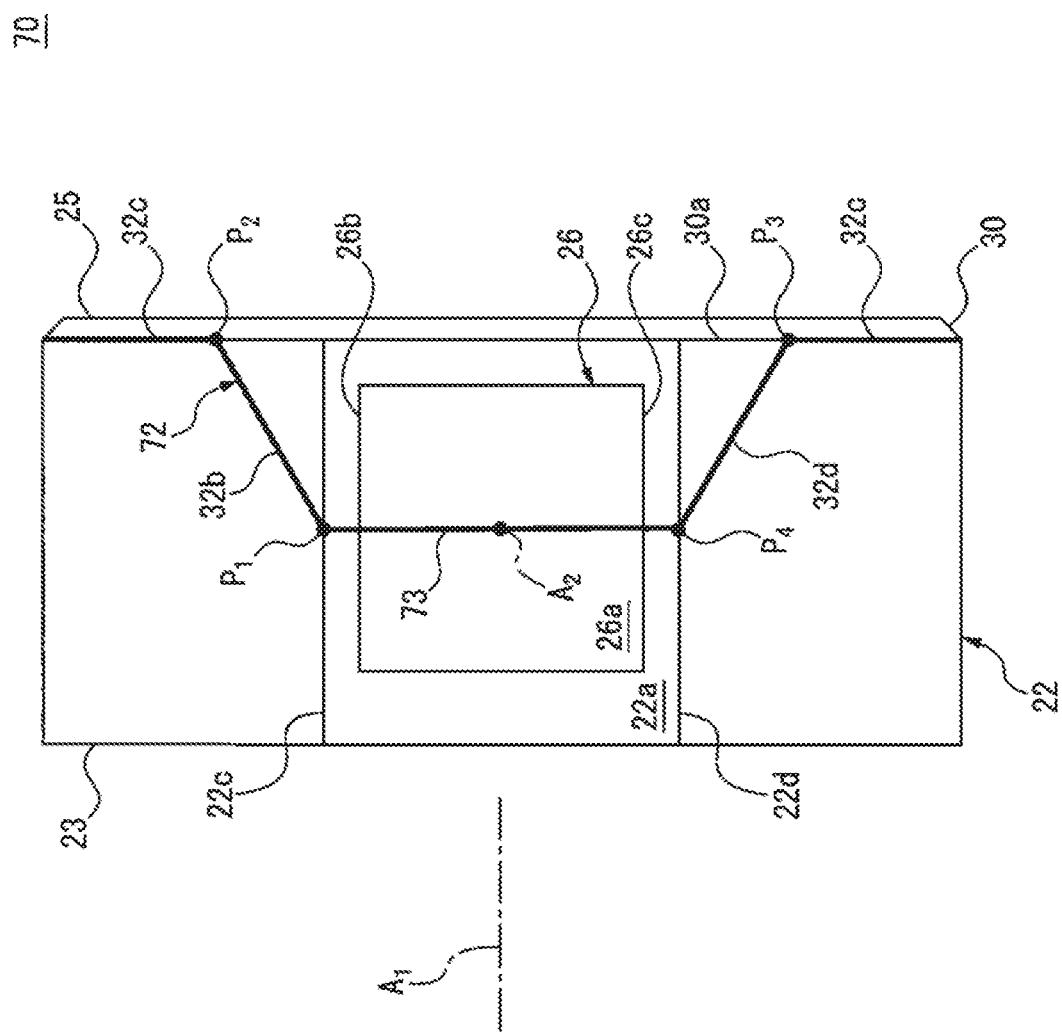
FIG. 10 is a diagram of a molded product according to yet another embodiment, and corresponds to FIG. 2.

Note that the through-hole 24 can be omitted from the molded product 18, 18' described above. Such an embodiment is illustrated in FIG. 10. A molded product 70 illustrated in FIG. 10 differs from the above-described molded product 18 in the following configuration. Specifically, in the molded product 70, the through-hole 24 is not formed in the protrusion 26 and the main body 22.

In addition, the molded product 70 is formed with a parting line 72 including lines 73, 32b, 32c, and 32d. The line 73 (first line) passes through a center of the protrusion 26 (axis $A_2$) and extends straight in the circumferential direction between the end point $P_1$ and the end point $P_4$.

The through-hole 24 can be formed in the protrusion 26 of the molded product 70 by e.g. the post-processing. Alternatively, a tap hole may be formed in the protrusion 26 of the molded product 70, and a handle (e.g., an eye bolt) for lifting the electric motor 10 may be fastened to the tap hole. In this case, the handle can be lifted by e.g. a crane to convey the electric motor 10.

Figure 11:
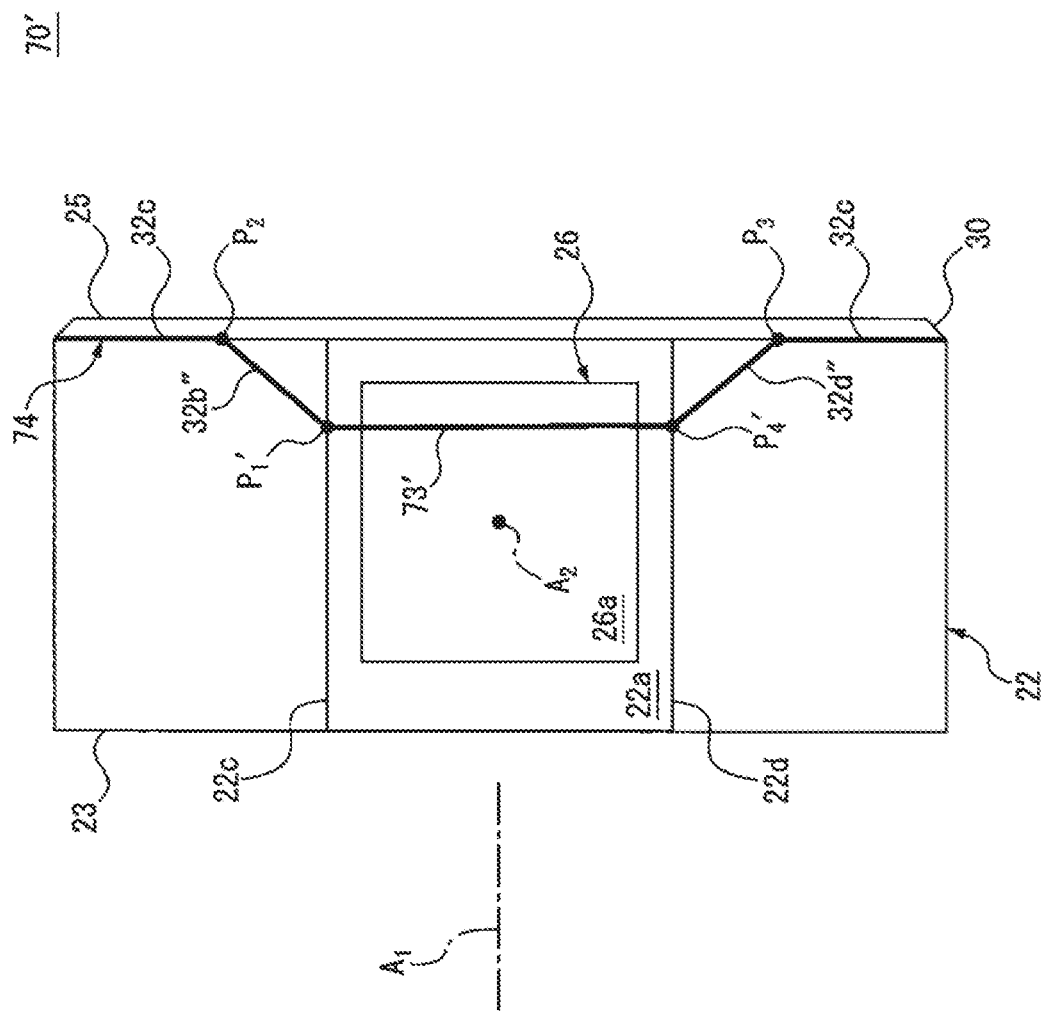
FIG. 11 is a diagram of a molded product according to yet another embodiment, and corresponds to FIG. 2.

Note that the line 73 may not necessarily pass through the center of the protrusion 26, but may be shifted in the axial direction from the center of the protrusion 26 within the axial section of the protrusion 26. Such an embodiment is illustrated in FIG. 11. A molded product 7' illustrated in FIG. 11 is formed with a parting line 74 including lines 73',32b", 32c, and 32d". The line 73' extends straight in the circumferential direction between the end point $P_1$' and the end point P$_4$' at a position shifted axially rearward from the center (axis A$_2$) of the protrusion 26.

In addition, the line 32b" extends so as to be inclined with respect to the axial direction between the end point P$_1$' and the end point P$_2$, while the line 32d" extends so as to be inclined with respect to the axial direction between the end point P$_4$' and the end point P$_3$. The molded products 70 and 70' as described above can also be formed by the pair of molds. In this case, the pin 56 described above is omitted, and the pair of molds have a mating surface that forms the lines 73 and 73'.

Figure 12:
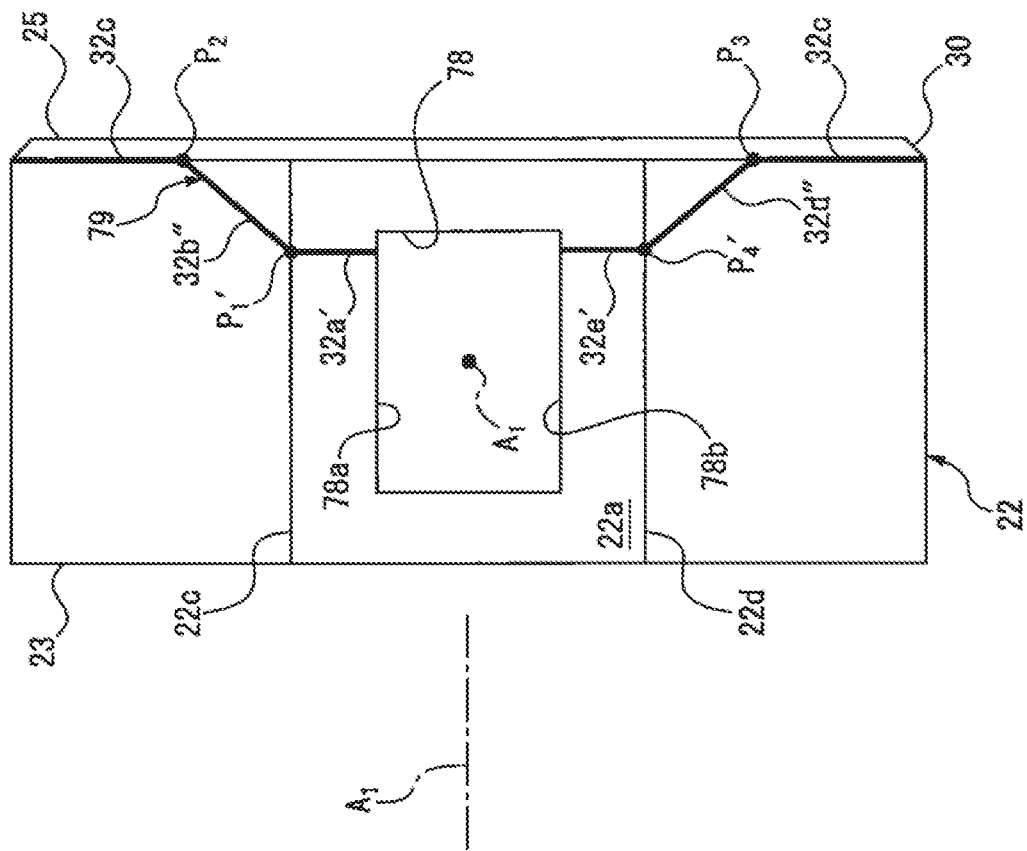
FIG. 12 is a diagram of a molded product according to yet another embodiment, and corresponds to FIG. 2.

Furthermore, if the above-described through-hole 24 has an outer shape similar as the protrusion 26, the lines 32a and 32e are not necessarily disposed at the same position in the axial direction as the center of the through-hole, and may be shifted in the axial direction from the center of the through-hole within the axial section of the through-hole. Such an embodiment is illustrated in FIG. 12.

The molded product 76 illustrated in FIG. 12 differs from the above-described molded product 70' in the following configuration. Specifically, the molded product 76 does not include the protrusion 26 described above, while it include a through-hole 78 penetrating through the main body 22 in the radial direction. The through-hole 78 has a square shape when viewed from the radial direction, and an end surface 78a in the one direction of the circumferential direction and an end surface 78b in the other direction of the circumferential direction that define the through-hole 78 are parallel to the axial direction.

In addition, the molded product 76 is formed with a parting line 79 including the lines 32a', 32b", 32c, 32d", and 32e'. The line 32a' linearly extends in the one direction of the circumferential direction from the through-hole 78 to the end point P$_1$' at a position shifted axially rearward from a center of the through-hole 78 (axis A$_2$).

On the other hand, the line 32e' linearly extends in the other direction of the circumferential direction from the through-hole 78 to the end point P$_4$' at the position shifted axially rearward from the center of the through-hole 78 (axis A$_2$). The molded product 76 can also be molded by the pair of molds. In this case, the above-described pin. 56 has the same outer shape as the through-hole 78, and the through-hole 78 is formed by the pin 56.

Note that the molded product 16 may have the same shape as the molded product 18, 18' (18"), 70, 70' or 76, and may be manufactured by the apparatus 50 or 50' described above. Also, the end point P$_1$ (or P$_4$) may be at a position shifted in the circumferential direction from the end edge 22c (or 22d) of the outer surface 22a.

The outer shape of the stator 14, or the molded product 18, 18',18",70, 70', or 76 may be a polygon other than an octagon, or may be any shape such as a circle, an oval, or the like. Also, the line 32a, 32a', 32b, 32b', 32b", 32c, 32c', 32d, 32d', 32d", 32e, 32e', or 73' may be curved. Also, the line 32b, 32b', or 32b" (second line) may extend parallel to the axial direction (axis A$_1$).

Figure 13:
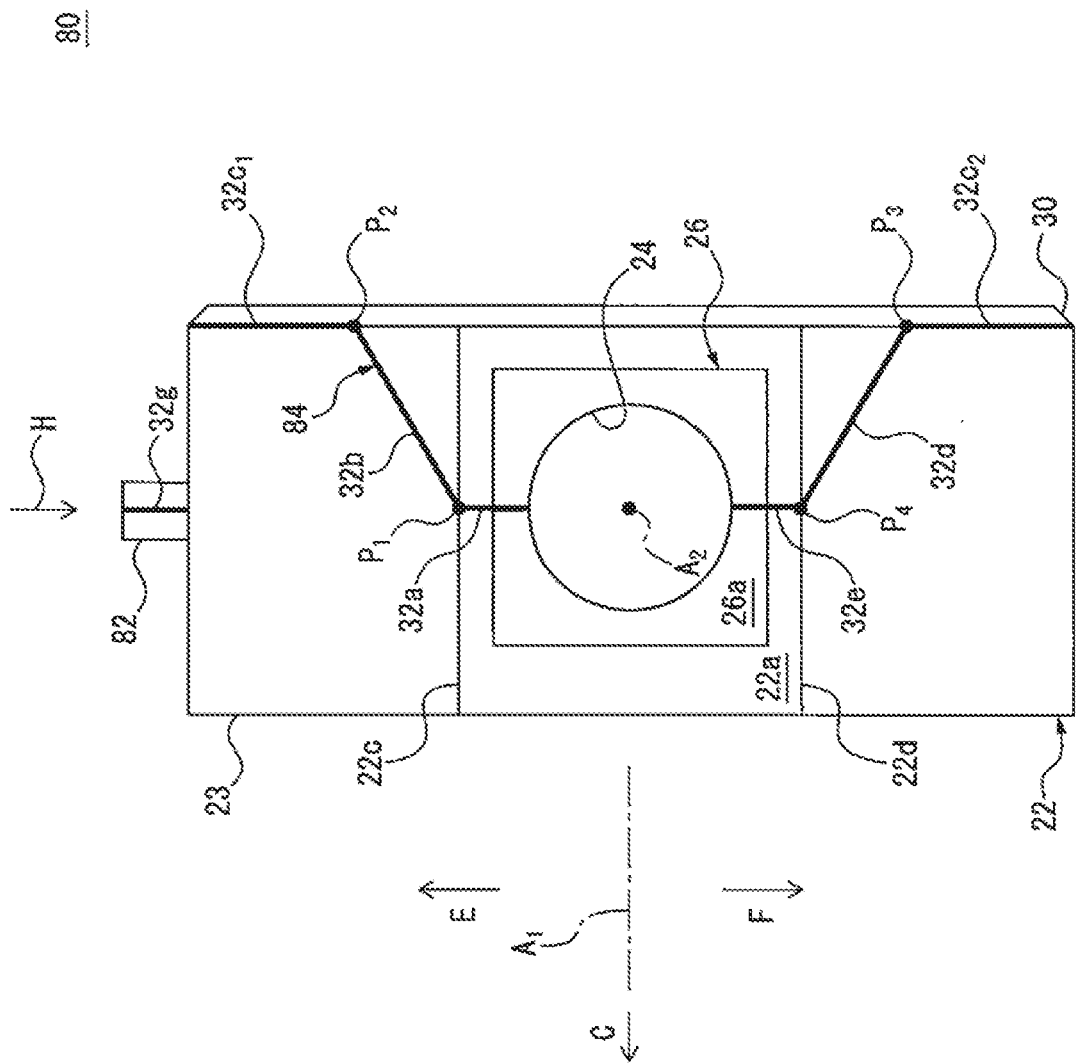
FIG. 13 is a diagram of a molded product according to yet another embodiment, and corresponds to FIG. 2.
Figure 14:
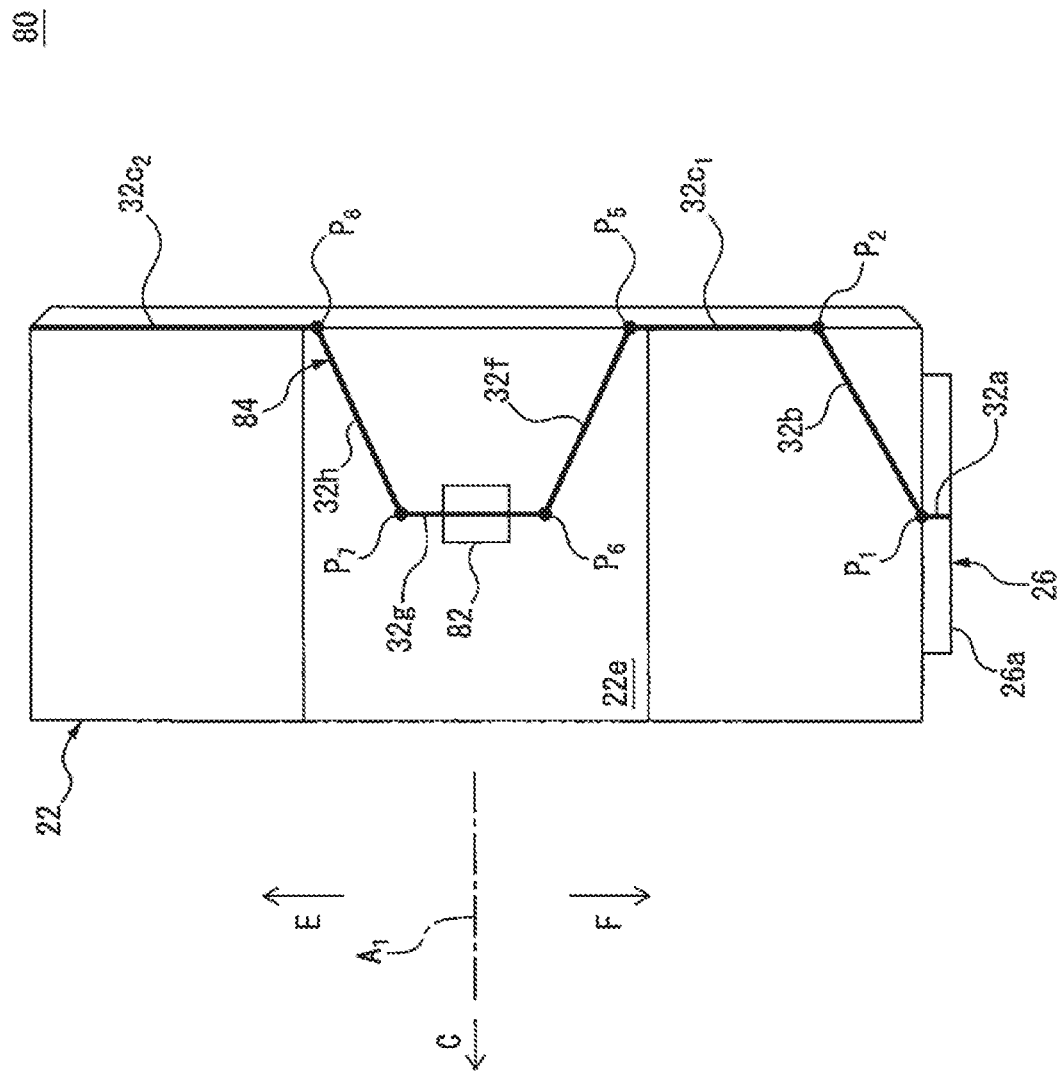
FIG. 14 is a diagram of the molded product illustrated in FIG. 13 as viewed from an arrow H in FIG. 13.

Additionally, a plurality of the through-holes 24 or 78, or a plurality of the protrusions 26 may be provided so as to be aligned in the circumferential direction. Such an embodiment is illustrated in FIG. 13 and FIG. 14. A molded product 80 illustrated in FIG. 13 and FIG. 14 differs from the above-described molded product 18 in the following configuration. Specifically, the molded product 80 further includes a protrusion 82. The protrusion 82 is disposed at a position shifted in the circumferential direction from the through-hole 24 and the protrusion 26, and formed integrally with an outer surface 22e of the main body 22 so as to protrude radially outward from the outer surface 22e.

The molded product 80 is formed with a parting line 84 including the line 32a, the line 32b, a line 3202, a line 32f, a line 32g, a line 32h, a line 3202, the line 32d, and the line 32e. The line 32c$_1$ (third line) extends in the one direction of the circumferential direction from the end point P$_2$ to an end point P$_5$, along the edge 30a of the chamfered portion 30. The end point P$_3$ is disposed on the edge 30a of the chamfered portion 30 on a side of the end point P$_2$ in the one direction of the circumferential direction.

On the other hand, the line 32g (first line) passes through the protrusion 82 and linearly extends in the circumferential direction between an end point P$_6$ and an end point P$_5$. The line 32f (second line) linearly extends from the end point P$_6$ to the end point P$_5$ so as to be inclined with respect to the axial direction. The line 32b (second line) linearly extends from the end point P$_7$ to an end point P$_8$ so as to be inclined with respect to the axial direction. The end point P$_8$ is disposed on the edge 30a of the chamfered portion 30.

The line 3202 (third line) extends in the one direction of the circumferential direction from the end point P$_8$ to the end point P$_3$ along the edge 30a of the chamfered portion 30. The protrusion 82 can be used as an element for forming the above-described tap hole for fastening the handle. It will be appreciated that the pair of molds for molding this molded product 80 have a mating surface that forms the parting line 84.

Note that the above-described end faces 26b and 26c in the circumferential direction of the protrusion 26 are substantially parallel to the axial direction, but, in practice, they are tapered surfaces inclined with respect to the axial direction such that a width therebetween in the circumferential direction becomes maximum at the position of the line 32a, 32e, 73, or 73'. Similarly, both end faces in the circumferential direction of the protrusion 82 described above are substantially parallel to the axial direction, but, in practice, they are tapered surfaces inclined with respect to the axial direction such that a width therebetween in the circumferential direction becomes maximum at the position of the line 32g.

In the embodiment described above, the molded product 18, 18',70, 70',76, 80 is the motor housing of the electric motor 10. However, the molded product 18, 18',70, 70',76, 80 may be any component of any device. For example, the molded product 18, 18',70, 70',76, or 80 may be a joint member that connects two tubes, or may be a restraining member into which a tube is inserted and which secures the tube to another member. Although the present disclosure has been described through the above embodiments, the above embodiments are not intended to limit the claimed invention.

The invention claimed is:

1. A molded product comprising:
   a cylindrical main body; and
   a hole penetrating through the main body in a radial direction of the main body, or a protrusion protruding from the main body in the radial direction,
   wherein a parting line corresponding to a mating surface of molds is formed on the molded product,
   wherein the parting line includes:
   a first line extending from the hole or the protrusion in one direction of a circumferential direction of the main body; and
   a second line extending from an end point of the first line in the one direction of the circumferential direction to an end portion of the main body in an axis direction of the main body.

2. The molded product of claim 1, wherein the parting line further includes a third line extending in the one direction of the circumferential direction from an end point of the second line opposite the end point of the first line, the third line being disposed at the end portion of the main body.

3. The molded product of claim 2, wherein a chamfered portion or a rounded corner portion is formed at the end portion of the main body,
wherein the third line is disposed at the chamfered portion or the rounded corner portion.

4. The molded product of claim 1, wherein the second line extends so as to be inclined with respect to the axial direction.

5. The molded product of claim 1, wherein the molded product is a motor housing of an electric motor.

6. An electric motor comprising the molded product of claim 5 as the motor housing.

7. An apparatus for manufacturing the molded product of claim 1, comprising:
a pair of molds openable and closable relative to each other, and configured to define a space for forming the molded product inside thereof when the pair of molds are closed,
wherein the pair of molds have the mating surface where the pair of molds contact each other when the pair of molds are closed,
wherein the mating surface includes:
a first mating surface extending in the one direction of the circumferential direction from a position corresponding to the hole or the protrusion, the first mating surface forming the first line; and
a second mating surface extending in one direction of the axial direction from an end edge of the first mating surface in the one direction of the circumferential direction, the second mating surface forming the second line.

8. The apparatus of claim 7, wherein the parting line further includes a third line extending in the one direction of the circumferential direction from an end point of the second line opposite the end point of the first line, the third line being disposed at the end portion of the main body,
wherein the mating surface further includes a third mating surface extending in the one direction of the circumferential direction from an end edge of the second mating surface opposite the end edge of the first mating surface, the third mating surface forming the third line.

9. A method of manufacturing a molded product by the apparatus of claim 7, the method comprising:
injecting a liquid material into the space in a state where the pair of molds are closed such that the pair of molds contact each other at the mating surface; and
solidifying the material to mold the molded product, and subsequently, opening the pair of molds and taking out the molded product therefrom.

* * * * *

UNITED STATES PATENT AND TRADEMARK OFFICE
CERTIFICATE OF CORRECTION

| | |
|---|---|
| PATENT NO. | : 11,539,276 B2 |
| APPLICATION NO. | : 17/016593 |
| DATED | : December 27, 2022 |
| INVENTOR(S) | : Ryuya Yasuda |

It is certified that error appears in the above-identified patent and that said Letters Patent is hereby corrected as shown below:

In the Claims

Claim 1, Column 11, Line 1, delete "axis" and insert -- axial --

Signed and Sealed this
Eighteenth Day of April, 2023

*Katherine Kelly Vidal*

Katherine Kelly Vidal
*Director of the United States Patent and Trademark Office*